F. M. AMSBRY.
HORSE BIT.
APPLICATION FILED OCT. 2, 1907.
914,219.
Patented Mar. 2, 1909.
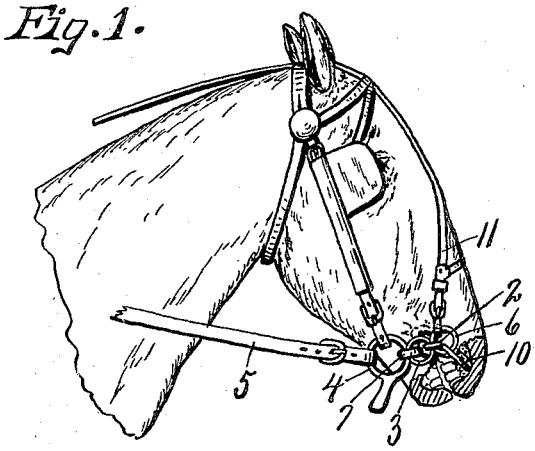
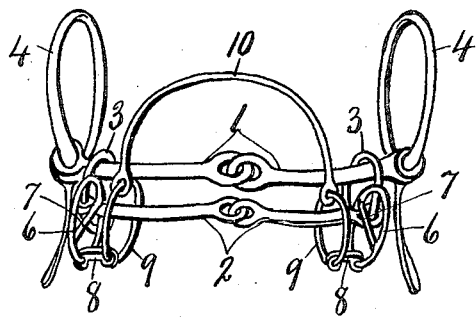

UNITED STATES PATENT OFFICE.

FRANK M. AMSBRY, OF BINGHAMTON, NEW YORK.

HORSE-BIT.

No. 914,219.   Specification of Letters Patent.   Patented March 2, 1909.

Application filed October 2, 1907. Serial No. 395,536.

*To all whom it may concern:*

Be it known that I, FRANK M. AMSBRY, of Binghamton, in the county of Broome, in the State of New York, have invented new and useful Improvements in Horse-Bits, of which the following, taken in connection with the accompanying drawings, is a full, clear, and exact description.

This invention relates to certain improvements in horse bits and is especially adapted for tough mouthed or fractious horses which are inclined to draw heavily upon the reins.

My special object is to provide a simple, practical and highly efficient device adapted to be attached to any horse bit and to be placed under the upper lip and against the gums of the upper jaw of the horse's mouth in such manner that a comparatively light tension upon the reins and bit connected thereto will produce a pressure against the sensitive part of the mouth directly under the upper lip without causing any mutilation, irritation or excessive pain to the animal and at the same time producing a sufficient pressure to subdue the most fractious or tough mouthed horse without excessive pull upon the reins.

In Fig. 1 of the drawings, I have shown a bridle and bit equipped with my improved attachment as applied to a horse's head. Fig. 2 is a perspective view of my improved bit.

In the drawings, I have shown the bit as composed of two bars —1— and —2— which are flexibly connected at their ends by links or rings —3— to constitute what may be termed a double bit or gag, one of the bars as —1— being provided at its ends with suitable rings —4— to which the reins as —5— are attached in the usual manner, said bar —1— being made of two similar parts flexibly joined together at their inner ends as best seen in Fig. 2. The bar —2— is also made of two similar parts flexibly joined at their inner ends, the outer end of each part being connected by the link —3— to the adjacent end of the bar —1— thereby permitting the bar —2— to move bodily around the bar —1—.

Loosely mounted upon the opposite ensd of one of the bars as the front bar —2— are a pair of rings —6— having diametrically cross bars —7— to stiffen the rings and to limit their circumferential movement around the bar —2— and to these rings —6— are attached links —8— connecting said rings to additional but similar rings —9— also loosely mounted upon the bar —2— in proximity to but just inside of the rings —6—. The rings —9— are flexibly connected to each other by a tie piece —10— which, in this instance, consists of an arc-shaped bar of wire or other suitable yielding material adapted to be inserted between the upper lip and gum of the upper jaw of the horse and to conform to the shape of said jaw when in action as best seen in Fig. 1.

The links —8— serve to hold the rings —6— and —9— a sufficient distance apart to receive between the opposite sides of the horses upper lip, the ring —6— being located at the opposite outer side of the horse's mouth while the rings —9— are adapted to be inserted together with the loop or tie piece —10— between the upper lip and upper jaw and therefore, when the device is placed in operation in the horse's mouth the loop or tie piece —10— will be located in front of the bit bars —1— and —2— so that any rearward pull or tensioning upon the reins —5— will cause the loop —10— to be drawn against the gum of the upper jaw with equal pressure both rearwardly and inwardly, while the joint of the bar —2— will be buckled against the roof of the horse's mouth. This portion of the mouth of the horse is, of course, extremely tender and, therefore, a comparatively light pressure of the loop or tie piece —10— against the front and sides of this part of the jaw will prevent the animal from voluntarily drawing tight upon the reins and will enable the driver to control the horse with but slight tensioning of said reins.

The rings —6— are attached to bridle straps —11— which serve to hold the bit bar —2— and tie pieces —10— in their adjusted position in the horse's mouth as more clearly shown in Fig. 1.

In operation both bit bars —1— and —2— are inserted in the mouth in the usual manner and the tie piece or attachment —10— is adjusted between the upper lip and upper jaw against the gums and being attached in the manner described to the rings —9— which are mounted upon the opposite ends of the bit bar —2—, it is evident that any rearward pull upon the reins will exert a corresponding pull of the loop or check bar —10— against the gums of the upper jaw and owing to the fact that this portion of the mouth is particularly tender, such pressure will cause the horse to voluntarily relax any vicious pull which he might exert upon the reins thereby enabling the driver to control the horse with comparative ease and safety. When the reins —5— are drawn up tightly tending to flex the joint in the bit —1—, the rings —3— are caused to slide along the jointed sections of the bit —1— thereby causing the joint in the bit —2— to buckle outwardly against the roof of the horse's mouth which affords means to restrain the horse from vicious pulling on the reins.

What I claim is:

In combination with a bit bar, a second bit bar flexibly connected to the first bit bar, separate pairs of rings mounted upon the second bar, those of each pair being spaced apart to receive the portions of one of the horse's lips, and a wire loop having its ends connected to the inner ring, and its intermediate portion arched forwardly and adapted to be inserted between the upper lip and upper jaw of the horse's mouth.

In witness whereof I have hereunto set my hand this 10th day of September 1907.

FRANK M. AMSBRY.

Witnesses:
H. E. CHASE,
C. M. McCORMACK.